J. F. CULLIN.
SOLDERING TOOL.
APPLICATION FILED APR. 4, 1918.

1,286,242.   Patented Dec. 3, 1918.

INVENTOR
Jasper F. Cullin.
BY
Pagelsen and Spencer
ATTORNEYS

UNITED STATES PATENT OFFICE.

JASPER F. CULLIN, OF DETROIT, MICHIGAN.

SOLDERING-TOOL.

1,286,242.  Specification of Letters Patent.  Patented Dec. 3, 1918.

Application filed April 4, 1918. Serial No. 226,585.

*To all whom it may concern:*

Be it known that I, JASPER F. CULLIN, a citizen of the United States, and residing at Detroit, in the county of Wayne and State of Michigan, have invented a new and Improved Soldering-Tool, of which the following is a specification.

This invention relates to soldering devices and particularly to those employed to secure two objects together, and its object is to provide a soldering tool wherein the solder is melted by an electric current passing through the solder.

This invention consists in a device for holding a piece of solder and means for conducting a current of electricity to the solder so that the current may flow through the solder to the objects to be secured together by the solder and thereby melt the solder. It further consists in mounting the solder and the means for conducting current thereto on one of the jaws of a pair of pincers or tongs, the other jaw being so formed as to properly press the article that is to receive the solder against the solder while the electric current is melting the solder and at the same time heating the article that is to receive the solder.

Figure 1:
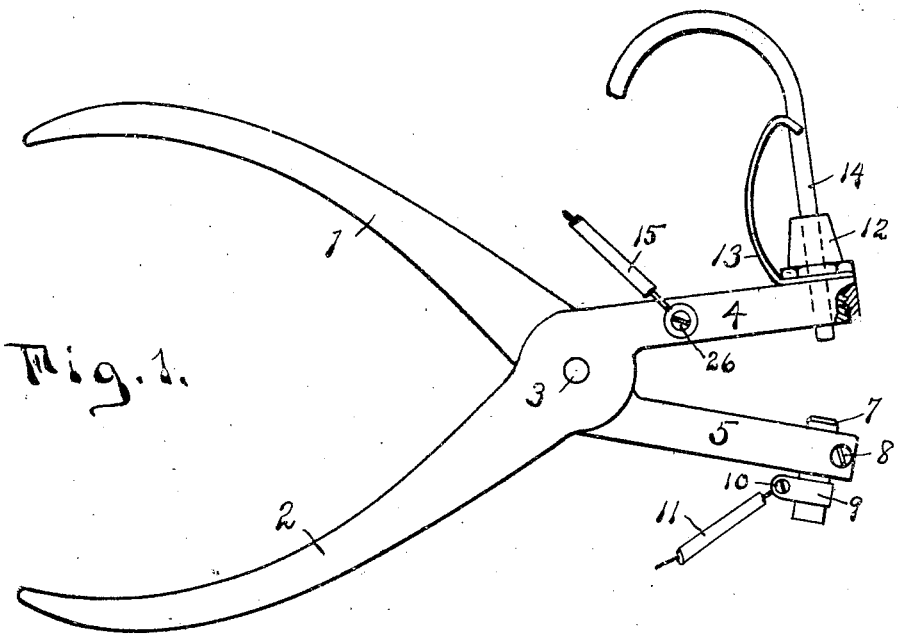
Figure 2:
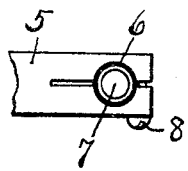
Figure 3:
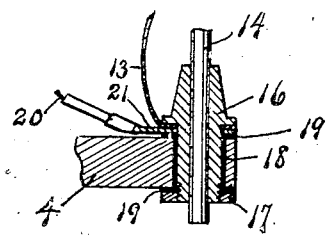
Figure 4:
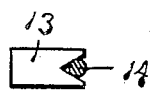

In the accompanying drawing, Figure 1 is an elevation of this improved soldering tool. Fig. 2 is a plan of the lower jaw. Fig. 3 is a central vertical section of the upper jaw, slightly modified. Fig. 4 is a view showing the spring to hold the solder.

Similar reference characters refer to like parts throughout the several views.

The tool shown in the drawing consists of the two parts 1 and 2, held together with a pivot 3, and having jaws 4 and 5. Mounted in the jaw 5 and insulated therefrom by means of a small shell 6 of gutta-percha, mica or other insulating material is a small rod 7 of carbon, copper or other conductor, the jaw being split and pinched onto the engaging member 7 by means of a screw 8. A small band 9, preferably of copper, grips this contact member 7 through the action of the screw 10, which screw may also cause the band to grip the circuit wire 11.

The other jaw 4 is preferably drilled and threaded to receive the guide 12 which passes through the annular lower end of the spring 13 and secures it in position to press its notched outer end against the rod 14 of solder, which rod is otherwise freely slidable in the guide 12. A circuit wire 15 may be connected directly to the jaw 4 by means of the screw 26.

The current used will be of low voltage, preferably about six volts. When the jaws of the tool are moved toward each other so that the rod 14 of solder and the contact 7 will engage the article to be soldered, current will pass from the guide 12 through the solder and the article to be soldered to the contact member 7, not only melting the solder but also heating the article to be soldered. A substantially instantaneous application is all that is necessary to deposit a small amount of solder at just the point desired. While the spring 13 will prevent the rod 14 of solder from slipping under normal conditions, it will not prevent the rod being moved forward by hand as desired.

In case the rod 14 is to be insulated, a construction such as shown in Fig. 3 may be employed. The guide 16 is threaded to receive the nut 17 and extends through the cylindrical shell 18 and two washers 19 of insulating material. The circuit wire 20 connects to a washer 21, and the spring 13 is of the same construction as heretofore described. When this construction is employed, the insulation for the rod 7 may be omitted if desired.

The general invention is embodied in the tool shown and resides in the melting of the solder by means of an electric current passing through the solder and through the article to be coated by the solder, means being provided to connect the solder and the article to be coated with a current source. It is evident that the details of construction may all be changed without departing from the spirit of my invention as set forth in the claims.

I claim:—

1. In a soldering tool, the combination of a pair of connected supports, a contact member mounted on one support and a piece of solder mounted on the other support, electric conductors operatively connected to said contact member and to said solder, and means to insulate the solder and the contact member from each other.

2. In a soldering tool, the combination of a pair of supports pivoted together, a rod of carbon carried by one support, a rod of solder adjustably carried by the other support, electric conductors operatively connected to the carbon and solder, and means to insulate the carbon from the solder.

3. In a soldering tool, the combination of a pair of handles pivoted together and a jaw on each handle, a guide mounted in one jaw, a rod of solder slidable therein, a spring to restrain the movement of said rod in the guide, an electric conductor operatively connected to said rod of solder, a contact member mounted in the other jaw of said tool, and a second electric conductor operatively connected to said contact member.

4. In a soldering tool, the combination of a pair of handles pivoted together and a jaw on each handle, a guide mounted in one jaw, a rod of solder in said guide, a contact member of carbon carried by the other jaw, an electric conductor connected to said carbon, and a second electric conductor connected to said tool to close the circuit to said carbon when work to be soldered is brought into the immediate vicinity of the carbon.

5. In a soldering tool, the combination of a contact member of carbon, a rod of solder and a guide therefor to direct the solder to the carbon, an electric conductor connected to the carbon, a support for the carbon and the guide for the solder, and a second electric conductor connected to said support so as to close the circuit when work is brought into operative relation to the carbon.

JASPER F. CULLIN.